(12) United States Patent
Selivanov

(10) Patent No.: US 6,227,193 B1
(45) Date of Patent: May 8, 2001

(54) METHOD FOR HEATING A LIQUID AND A DEVICE FOR ACCOMPLISHING THE SAME

(75) Inventor: Nikolai I. Selivanov, Ekaterinburg (RU)

(73) Assignee: Advanced Molecular Technologies, L.L.C., Westlake Village, CA (US)

( * ) Notice: Subject to any disclaimer, the term of this patent is extended or adjusted under 35 U.S.C. 154(b) by 0 days.

(21) Appl. No.: 09/313,326

(22) Filed: May 17, 1999

Related U.S. Application Data

(63) Continuation of application No. 08/945,057, filed on Oct. 16, 1997, now Pat. No. 6,016,798, which is a continuation of application No. PCT/RU95/00070, filed on Apr. 18, 1995.

(51) Int. Cl.$^7$ ...................................................... F24C 9/00
(52) U.S. Cl. ............................................. 126/247; 122/26
(58) Field of Search ............................... 126/247; 122/26; 165/84, 88, 105; 426/241, 231, 237, 238, 522, 234; 99/451

(56) References Cited

U.S. PATENT DOCUMENTS 797,847  8/1905  Gilroy .

(List continued on next page.)

FOREIGN PATENT DOCUMENTS 419065  2/1967  (CH) .

(List continued on next page.)

OTHER PUBLICATIONS

"Ultrasonic Visbreaking of Athabasca Bitumen" by Chakma and F. Berruti; Department of Chemical and Petroleum Engineering, The University of Calgary, Calgary, Alberta, Canada T2N 1N4. From Heavy Crude and Tar Sands: Hydrocarbons for the 21st Century, 5th UNITAR International Conference Held Aug. 4–9, 1991.*

(List continued on next page.)

Primary Examiner—James C. Yeung
(74) Attorney, Agent, or Firm—Snell & Wilmer, L.L.P.

(57) ABSTRACT

Disclosed are a method and apparatus for heating a liquid using mechanical vibrations. The liquid is introduced into a cavity (1) in a rotating wheel (2) and expelled into an annular chamber (4) formed by the wheel and the stator (7), passes through a series of outlet apertures (8) and is removed. For this process, the following empirical relationships are preferred: R=1.1614 K/mm; ΔR=1.1614 B/mm; and n=3.8396 K$^{-1.5}$×10$^6$ revs./min, R being the radius of the peripheral cylindrical surface of the wheel, ΔR being the radial dimension of the annular chamber, n the rotation frequency of the wheel, K the number of outlet apertures in the wheel. B is an integer in the rang of 1–K/5.

A method and an apparatus for heating a liquid /FIG. 1/ by means of the effects of mechanical vibrations that includes the introduction of the liquid into a cavity /1/ in a revolving rotating wheel /2/, the expulsion of the liquid into an annular chamber /4/ that is formed by the rotating wheel and the stator /7/, the passage of the liquid through a series of outlet apertures /8/, and the subsequent removal of the liquid. In this process, the following empirical relationships are preferred:

| R = 1.1614 | K | /mm/, |
| ΔR = 1.1614 | B | /mm/ and |
| n = 3.8396 | K$^{-1.5}$ × 10$^6$ | revs./min, where |

R—is the radius of the peripheral cylindrical surface of the rotating wheel,

ΔR—is the radial dimension of the annular chamber, n—is the rotation frequency of the wheel, K—is the number of outlet apertures in the rotating wheel, and B—is an integer in the range of 1–K/5.

12 Claims, 3 Drawing Sheets

U.S. PATENT DOCUMENTS

| | | |
|---|---|---|
| 823,856 | 6/1906 | Gilroy . |
| 1,338,996 | 5/1920 | Norcross . |
| 1,382,765 | 6/1921 | Dixon . |
| 1,489,786 | 4/1924 | Povey . |
| 1,489,787 | 4/1924 | Povey . |
| 1,790,967 | 2/1931 | Auerbach . |
| 1,873,037 | 8/1932 | Ringgenberg . |
| 1,890,106 | 12/1932 | Biedixen . |
| 2,009,957 | 7/1935 | Esch . |
| 2,560,728 * | 7/1951 | Lee ........................................ 126/247 |
| 2,578,377 | 12/1951 | Smith . |
| 2,664,274 * | 12/1953 | Worn et al. ............................ 165/84 |
| 2,748,762 | 6/1956 | Booth . |
| 2,960,314 * | 11/1960 | Bodine .................................. 165/84 |
| 3,194,540 | 7/1965 | Hager . |
| 3,268,432 | 8/1966 | Nance . |
| 3,273,631 * | 9/1966 | Neuman ................................ 122/26 |
| 3,284,056 | 11/1966 | McConnaughay . |
| 3,497,005 | 2/1970 | Pelofsky . |
| 3,614,069 | 10/1971 | Murry . |
| 3,616,375 | 10/1971 | Inoue . |
| 3,630,866 | 12/1971 | Pelofsky . |
| 3,679,182 | 7/1972 | Clocker . |
| 3,744,763 | 7/1973 | Schnoring . |
| 3,789,617 * | 2/1974 | Rannow ................................. 165/84 |
| 3,809,017 | 5/1974 | Eskeli . |
| 3,902,549 | 9/1975 | Opfermann . |
| 3,915,858 | 10/1975 | Condolios . |
| 3,926,010 | 12/1975 | Eskeli . |
| 3,933,007 | 1/1976 | Eskeli . |
| 4,172,668 | 10/1979 | Thompson . |
| 4,256,085 * | 3/1981 | Line ...................................... 122/26 |
| 4,294,549 | 10/1981 | Thompson . |
| 4,295,600 | 10/1981 | Saget . |
| 4,391,608 | 7/1983 | Dondelewski . |
| 4,590,918 | 5/1986 | Kuboyama . |
| 4,664,068 | 5/1987 | Kretchmar . |
| 4,750,843 | 6/1988 | Endtner . |
| 4,810,240 | 3/1989 | Zuccato . |
| 4,915,509 | 4/1990 | Sauer . |
| 4,936,821 | 6/1990 | Zuccato . |
| 4,938,606 | 7/1990 | Kunz . |
| 4,992,614 | 2/1991 | Rodewald . |
| 5,020,916 | 6/1991 | Fritsch . |
| 5,104,541 | 4/1992 | Daniel . |
| 5,110,443 | 5/1992 | Gregoli . |
| 5,125,367 | 6/1992 | Ulrich . |
| 5,184,678 | 2/1993 | Pechkov . |
| 5,276,248 | 1/1994 | Engelhardt . |
| 5,392,737 | 2/1995 | Newman, Sr. . |
| 5,419,306 | 5/1995 | Huffman . |
| 5,500,117 | 3/1996 | Hamdan . |
| 5,531,157 | 7/1996 | Probst . |
| 5,547,563 | 8/1996 | Stowe . |
| 5,711,262 | 1/1998 | Ban . |
| 5,718,193 | 2/1998 | Ban . |

FOREIGN PATENT DOCUMENTS

| | | |
|---|---|---|
| 4308842A1 | 9/1994 | (DE) . |
| 191472 | 1/1923 | (GB) . |
| 2044794A | 10/1980 | (GB) . |
| 986475 | 1/1983 | (SU) . |

OTHER PUBLICATIONS

"Upgrading of Heavy Oil Via Interfacial Hudrogenation Under Cavitation Conditions" vby Teh Fu Yen and Jiun-n–Ren Lin: School of Engineering, University of Southern California, Los Angeles, CA. From: Heavy Crude and Tar Sands: Hydrocarbons for the 21st Century, 5th UNITAR International Conference Held Aug. 4–9, 1991.*

"Enhancement of Bitumen Separation from Tar Sand by Radicals in Ultrasonic Irradiation" by J.F. Kuo, K. Sadeghi, L.K. Jang, M.A. Sadeghi, and T.F. Yen School of Engineering University of Southern California Los Angeles, CA 90089–0231.*

* cited by examiner

METHOD FOR HEATING A LIQUID AND A DEVICE FOR ACCOMPLISHING THE SAME

CROSS-REFERENCE TO RELATED APPLICATION

This application is a continuation of U.S. National application Ser. No. 08/945,057 filed Oct. 16, 1997, Now U.S. Pat. No. 6,016,798 which is a U.S. national application corresponding to PCT application number PCT/RU95/00070 having a priority date of Apr. 18, 1995.

BACKGROUND OF THE INVENTION

The present invention has to do with a means of acquiring and using heat that is formed in a different way than as a result of combustion. More immediately, the invention has to do with a method and a device for heating a liquid by means of processing it with the aid of mechanical effects.

From the current state of technology we are broadly familiar with the capabilities for heating a liquid as a result of the unavoidable or concomitant mechanical effects on it of such forces as, specifically, the forces of friction during contact with a surrounding environment, the forces of internal friction during agitation of a stream of liquid, and the forces arising during hydraulic impacts and cavitation. The energy that is expended during these processes on heating a liquid is viewed as a natural energy loss.

The effect of heating a liquid as a result of the deliberate—though this may not be the primary purpose—effects on it of mechanical vibrations in the sonic or ultrasonic range is also widely known in technology. And in this particular case the energy that is expended in heating the liquid is traditionally viewed as unavoidable energy losses. Particularly well-known from the current state of technology /V. I. Bigler et al., "The Dispersal Of Various Materials In A Device Of The Hydraulic Siren Type," in the collection of scientific studies No. 90 of the Moscow Institute for Steel and Alloys "Application Of Ultrasonic Waves In Metallurgy," the "Metallurgiya" Publishing House, 1977, p. 73 . . . 76/ is the effect of rapid heating of a liquid utilizing a device of the so-called hydrodynamic siren type. This device contains a rotating wheel having a cavity with a feeding or conveying aperture for supplying the liquid and a series of outlet apertures that are uniformly distributed along the periphery and that are installed in its peripheral wall with a conical external surface, and a stator having a cavity with an outlet aperture for expelling the liquid and a series of inlet apertures that are uniformly distributed along the periphery and that are installed in its wall, which latter is adjacent at a small distance to the peripheral wall of the rotating wheel, in which both the series of apertures of the rotating wheel and the series of apertures of the stator are arranged on a plane of the revolution [of the wheel]. When the wheel is rotating, the liquid flowing out from the outlet apertures of the rotating wheel and toward the inlet aperture of the stator is subject to the effect of induced mechanical vibrations of a defined frequency, depending upon the rate of revolution of the rotating wheel and upon the number of its outlet apertures. In the given case, the activation of these vibrations in the liquid is only designed to disperse the material that is contained in the liquid. Nonetheless, the authors noted the fact of an abnormally rapid heating of the liquid. They explained this rapid heating by an increase in the hydraulic resistance during the run-over or overflow of the liquid from the cavity of the rotating wheel into the cavity of the stator. In the case at hand, however, the authors did not provide an explanation for this phenomenon in purely quantitative terms.

Also well-known at the current level of technology /International Patent Registration No. PCT/RU92/00194 of 1992/ is a method of heating a liquid by means of processing it by means of mechanical vibrations. This method involves the injection of the liquid to be processed into the cavity of a revolving rotating wheel; bringing the liquid to revolve along with the rotating wheel; the expulsion of the liquid from the cavity of the rotating wheel through a series of outlet apertures on its peripheral cylindrical surface; the injection of the liquid into a cavity of the stator through at least one inlet aperture in the concentric surface of the stator lying as close as possible to the peripheral cylindrical surface of the rotating wheel; during which there occur periodic abrupt interruptions in the flow of the liquid that serve to activate or stimulate mechanical vibrations in the liquid. As a result of such processing, the liquid that is arriving in the cavity of the stator, as established by the authors, is heated to a higher degree than could be explained by the aggregate or overall hydraulic losses. However, this effect of an abnormal heating of a liquid, which in principle was merely detected, was neither sufficient not stable enough to be used in practical applications with assured success. The reason for that may reside in the incorrect selection of the parameters of the process, and specifically in the incorrect selection of the rate of revolution of the rotating wheel and of its interdependence upon the geometrical dimensions and the number of the outlet apertures of the rotating wheel.

Taking into account the preceding, the author of the present invention earlier worked out an improved method and device for heating a liquid in accord with the patent application U.S. Pat. No. 08/218620 of March 1994. The method in accord with this patent application includes supplying a liquid to be processed into the cavity of a revolving rotating wheel; the bringing of the liquid undergoing processing to revolve along with the rotating wheel; the expulsion of the liquid from the cavity of the rotating wheel through a series of outlet apertures on its peripheral cylindrical surface; the injection of the liquid into the cavity of the stator through at least one inlet aperture on the concentric surface of the stator lying as close as possible to the peripheral cylindrical surface of the rotating wheel; during which there occurs periodic abrupt interruptions in the flow of the liquid that stimulate mechanical vibrations in it. According to available information, this represented the first time an attempt was made to express the preferred dependence between the linear velocity of the liquid on the periphery of a specified radius and this radius in mathematical terms, in the form of empirical relationship $$RV^2 = 253.264 \text{ m}^3/\text{s}^2.$$

The device for implementing the described method for heating a liquid contains a rotor, including a shaft located in bearings; a rotating wheel that is connected to the shaft and made in the form of a disk with a peripheral annular wall having cylindrical exterior and interior surfaces in which are located a series of outlet apertures for passing the liquid, which outlet apertures are uniformly arranged along the periphery; a stator that contains the rotating wheel as it revolves or spins and that has an inlet aperture for feeding in the liquid and an outlet aperture for expelling the liquid, and two concentric walls that from both sides come as close as possible to the peripheral annular wall of the rotating wheel; in both concentric walls of the stator are located at least one aperture for the passing of the liquid, which aperture is lying on a plane with the positioning of the series of apertures of the rotating wheel.

The described method and device even though they assure an increase in the temperature of the liquid to a higher degree than the temperature that can be achieved by means of hydraulic loss, the method and the device for heating of a liquid described above still do not make it possible to realize the inventor's scheme in a reliable and practical way with the greatest possible efficiency. The reason for that may be said to lie in the absence of sufficient specificity in assigning the position of the circumference of the radius R, in the sense that the quantity $RV^2$ was given concurrently and unambiguously, and also in the fact that there is virtually no opportunity here for the liquid that is leaving the rotating wheel to swirl about freely.

SUMMARY OF THE INVENTION

The goal of the present invention is to solve the problem of creating a method for heating a liquid and a device for accomplishing such heating that would make it possible reliably to implement in practice the desired transformation of mechanical energy into heat with increased efficiency, and this goal is to be achieved on the basis of the present level of technology and using the author's personal research.

This problem is solved according to the invention by processing the liquid with the aid of the mechanical effects on it of a process of swirling motion. This process of swirling motion has a specifically defined linear velocity on a specifically defined radius of revolution, and with the superimposition of a process of vibrations having a specifically defined frequency.

For this method of heating a liquid in the basic working embodiment of the invention, the liquid that is to be subject to processing is fed into the cavity of a revolving wheel; the liquid undergoing processing is expelled from the cavity of the rotating wheel into the annular chamber that is formed by its peripheral cylindrical surface and the concentric surface of the stator, through a series of outlet apertures that are located on the peripheral cylindrical surface of the rotating wheel and that are uniformly distributed along the periphery; the liquid is expelled from the annular chamber through at least one outlet aperture. For this to take place, the radius R of the peripheral cylindrical surface of the rotating wheel and the frequency or rate of its revolutions n is determined by the number K of outlet apertures chosen for the rotating wheel in a range corresponding to the empirical relationships $R=(1.05 \ldots 1.28)$ K mm and $N=(3.6 \ldots 4.1)$ $K^{-1.5} \times 10^6$ rpm.

Beyond the bounds of the indicated range of parameters, the achieved result of an abnormal heating of a liquid, as has been demonstrated experimentally, is expressed with inadequate precision.

In the most preferred implementation of a method of heating of a liquid, the radius R and the rate of revolution n of the rotating wheel are defined unambiguously by the selected number K of its outlet apertures, according to the empirical relationships $R=1.1614$ K mm and $N=3.8396$ $K^{-1.5} \times 10^6$ rpm.

In another preferred implementation of a method for heating a liquid, the expulsion of the processed liquid from the annular chamber that is formed by the peripheral cylindrical surface of the rotating wheel and the concentric surface of the stator, is accomplished through a series of outlet apertures that are located on the concentric surface of the stator and which, during the revolution of the wheel, are sequentially positioned opposite the outlet apertures of the rotating wheel.

In the basic embodiment of a method for heating a liquid which has been described above, and using the indicated ranges for selecting parameters, a temperature for heating a liquid is in principle achieved that, as has been shown experimentally, exceeds the temperature achieved merely as a result of hydraulic loss. This temperature reaches such a degree so reliably and with such stability that it is permissible to speak of a purposeful and sufficiently efficient utilization of the basic embodiment of the method for heating a liquid as can be used in practical applications. The resulting positive total balance of energy may be explained—without pretending to exhaustiveness as regards completeness or accuracy, and keeping in mind the law of the preservation of energy—by the liberation of the potential energy of the interior bonds of the liquid at the molecular level as a result of the periodic effects actuated in essence in mechanical fashion on the liquid at precisely defined critical frequencies, and their harmonics. In the most preferred working embodiment of a method for heating a liquid by selecting the indicated unambiguous values for the parameters, which has been experimentally demonstrated, the resulting effect of a superfluous balance of energy appears even more markedly. The other preferred working embodiment of a method for heating a liquid makes it possible to improve the achieved effect. This improvement is owing to the combined effect on the liquid of the vibrations occurring, first, during its expulsion through the outlet apertures of the rotating wheel into the annular chamber, and then subsequently during its expulsion from the annular chamber through the outlet apertures and onto the concentric surface of the stator.

A method for heating a liquid in accord with the invention may be effected only with the aid of the device described hereinafter. This device constitutes an integral part of the inventor's overall plan and is not intended to be used for any other purposes.

The device for the heating of a liquid in the basic working embodiment contains a rotor, including a shaft located in the bearings; at least one rotating wheel that is linked with the shaft and made in the form of a disk with a peripheral annular wall having a cylindrical exterior surface in which are arranged a series of outlet apertures for the liquid, which apertures are uniformly distributed along the periphery; a stator that contains the rotating wheel and which has an inlet aperture for supplying the liquid and an outlet aperture for expelling the liquid; a cavity for the liquid undergoing. processing that is formed from the disk and the peripheral annular wall of the rotating wheel and the wall of the stator with an inlet aperture adjacent to it; an annular chamber for processing the liquid which is constrained in its radial direction by the peripheral annular wall of the rotating wheel and the concentric wall of the stator and communicating with the outlet aperture for expelling the liquid; in which case, the characteristic geometrical dimensions of the rotating wheel and of the annular chamber come to:

$R=(1.05 \ldots 1.28)$ K mm, where

K—is the selected number of outlet apertures of the rotating wheel,

R—is the radius of the cylindrical exterior surface of the peripheral annular wall of the rotating wheel, and $R=(1.05 \ldots 1.28)$ B mm, where B—is the selected integer in the range of $1 \ldots K/2$, $\Delta R$—is the radial dimension of the annular chamber.

In the most preferred working embodiment of the device for heating of a liquid, the radius R and the dimension $\Delta R$ amount to correspondingly:

$R=1.1614$ K mm, $\Delta R=1.1614$ B mm, where

B—is the selected integer in the range of $1 \ldots K/5$.

In the other preferred working embodiment of the device for heating a liquid, the stator has a cavity that is adjacent to its concentric wall for receiving the liquid from the annular chamber, which latter communicates with the outlet aperture for expelling the liquid; in which case, the cavity of the stator is connected with the annular chamber by outlet apertures that are located on the concentric wall of the stator on a plane with the location of the outlet apertures of the rotating wheel and that are uniformly distributed along the periphery; the number of outlet apertures of the annular chamber is made up of 1 . . . K.

Other peculiarities of the invention become evident from the more detailed descriptions of examples of it that follow hereinafter.

BRIEF DESCRIPTION OF THE DRAWINGS

Greater detail of the invention appears below in the practical examples resulting from it that are illustrated schematically by drawings, in which are presented.

DETAILED DESCRIPTION OF THE INVENTION

Figure 1:
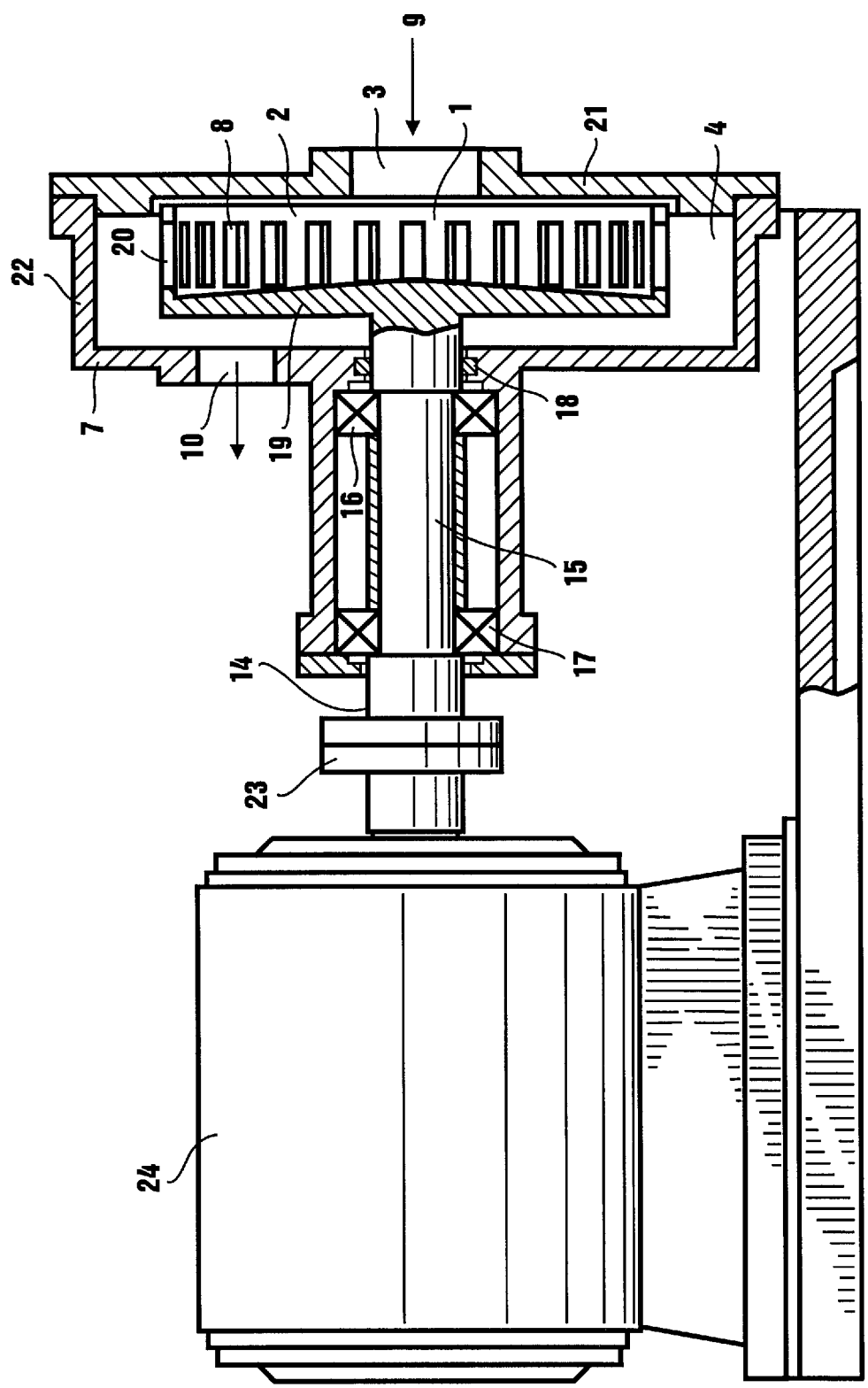
FIG. 1—a longitudinal axial section of the device for the heating of a liquid using the basic and most preferred working embodiment.

In accord with the basic working embodiment /FIG. 1,2/ of the method for heating a liquid by means of processing it with the aid of mechanical effects, the liquid to be subject to processing is fed into the cavity 1 of the revolving rotating wheel 2 through an inlet aperture 3. While the rotating wheel 2 is revolving, the liquid undergoing processing is expelled from its cavity 1 into the annular chamber 4 that is formed by the peripheral cylindrical surface 5 of the rotating wheel 2 and of the concentric surface 6 of the stator 7, through a series of outlet apertures 8, that are arranged on the peripheral cylindrical surface 5 of the rotating wheel 2 and that are uniformly distributed along the periphery. Within the boundaries of the annular chamber 4, the liquid undergoing processing—while continuing to swirl around relative to the central axis 9 according to the law of free flows—is subject to the effect of mechanical vibrations caused by the interaction of the elementary streams of liquid flowing out of each outlet aperture 8 of the rotating wheel 2 with the concentric surface 6 of the stator 7. The processed liquid is expelled out of the annular chamber 4 through the outlet aperture 10.

The radius R of the peripheral cylindrical surface 5 and the rate of revolution n of the rotating wheel 2 are determined by the selection of the number K of the outlet apertures 8 of the rotating wheel 2 in a range in accord with the empirical relationships.:

R=(1.05 . . . 1.28) K mm, n=(3.6 . . . 4.1) $K^{-1.5} \times 10^6$ /revs./min.

In accord with the most preferred method for heating a liquid, the radius R and the frequency of revolution n of the rotating wheel 2 are unambiguously defined by the number K of outlet apertures 8 selected for the rotating wheel 2, in accordance with the empirical relationships:

R=1.1614 K mm, n=3.8396 $K^{-1.5} \times 10^6$ rpm.

Figure 3:
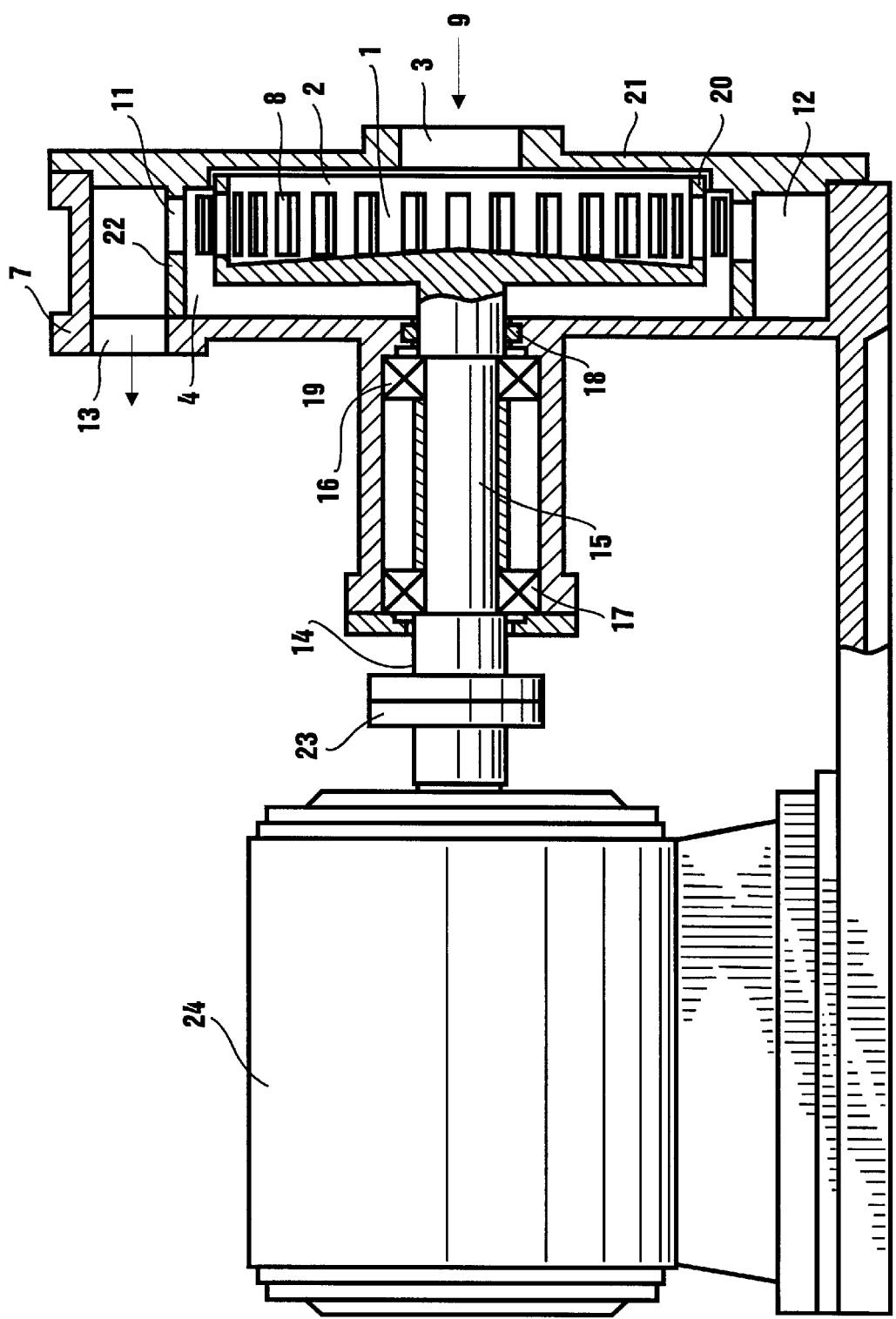
FIG. 3—a longitudinal axial section of the device for the heating of a liquid in one of the preferred working embodiments.

In accord with another preferred working embodiment / FIG. 3,4/ of a method for heating a liquid, the expulsion of the liquid undergoing processing from the annular chamber 4 that is formed from the peripheral cylindrical surface 5 of the rotating wheel 2 and the concentric surface 6 of the stator 7, is accomplished by one, several or a whole series of outlet apertures 11 on the concentric surface 6 of the stator 7. These outlet apertures 11 of the annular chamber 4 during the revolutions of the rotating wheel 2 are sequentially positioned opposite the corresponding outlet apertures 8 of the rotating wheel 2, [thereby] stimulating periodic perturbation of the stream and corresponding mechanical vibrations in the liquid. The liquid, passing through the outlet apertures 11 of the annular chamber 4, arrives in the cavity 12 of the stator 7, from whence the processed liquid is expelled through the outlet aperture 13.

The number of outlet apertures 11 of the annular chamber 4 is selected from a range of from one to K. However, it must be borne in mind in this case that, all other conditions remaining the same, an increase in the number of outlet apertures 11 adequately increases the volumetric output of the process, but lowers the temperature of the heated liquid.

In accord with the basic working embodiment /FIG. 1,2/ of the device for bringing about the described method of heating a liquid, it contains a rotor 14, which includes a shaft 15 located in the bearings 16 and 17 and equipped with a gasket 18. The rotor 14 contains at least one rotating wheel 2 connected with the shaft 15 and made in the form of a disk 19 with a peripheral annular wall 20, which annular wall has a cylindrical external surface 5. In this wall 20 are located a series of outlet apertures 8 for the liquid, uniformly distributed along the periphery.

The stator 7, which contains the rotating wheel 2 while it revolves, has an inlet aperture 3 for supplying the liquid for processing and an outlet aperture 10 for expelling the processed liquid. A cavity 1 for receiving the liquid to undergo processing is formed by the disk 19 and the annular wall 20 of the rotating wheel 2 and the wall 21 of the stator 7 that is adjacent to it and has the inlet aperture 3. The annular chamber 4 for receiving the liquid undergoing processing is constrained in a radial direction by the annular wall 20 of the rotating wheel 2 and the concentric wall 22 of the stator 7 and communicates with the outlet aperture 10 for expelling the processed liquid.

The characteristic geometrical dimensions of the rotating wheel 2 and of the annular chamber 4 come to:

R=(1.05 . . . 1.28) K mm,

ΔR=(1.05 . . . 1.28) B mm, where

K—is the number of outlet apertures selected for the rotating wheel, and

R—is the radius of the cylindrical exterior surface of the peripheral annular wall of the rotating wheel, B—is the integer selected in the range of 1 . . . K/2, and ΔR—is the radial dimension of the annular chamber.

In the most preferred working embodiment /FIG. 1,2/ of the device for heating a liquid, the nominal radius R unequivocally comes to R=1.1614 K mm, Whereas the nominal radial dimension ΔR comes to ΔR=1.1614 B mm, where B—is the integer selected in the range of 1 . . . K/5.

In accord with another preferred working embodiment / FIG. 3,4/ of the device for heating a liquid, the stator 7 has a cavity 12 adjacent to its concentric wall 22 for receiving the liquid from the annular chamber 4 and it communicates with an outlet aperture 13 for expelling the processed liquid. The cavity 12 of the stator 7 communicates with the annular chamber 4 by outlet apertures 11 for expelling the liquid from the annular chamber 4 and simultaneously for its injection into cavity 12, which outlet apertures are located in the concentric wall 22 of the stator 7. These outlet apertures 11 are located on a plane with the positioning of the series of outlet apertures 8 of the rotating wheel 2 and uniformly distributed along the periphery. The number of apertures 11 amounts to from one to K, although their number beyond K is not useful given the marked decrease, all other things being equal, of the heating effect [to which they then lead-Tr.].

The rotor 14 is connected by means of the shaft 15 and the coupling or socket 23 with the means for driving it at a designated rate of revolution, for example, with an electric motor 24.

The rotor may include several rotating wheels located on one shaft which are sequentially interconnected downstream in the liquid. Each rotating wheel may be equipped with blades.

A by-pass passageway with a shut-off regulating element, for both internal and external use, may be envisaged for the return injection or re-supply of a part of the processed liquid from the outlet of the device back to its inlet, so as to repeat the processing.

The device as a whole may take up any spatial location.

The number K of outlet apertures 8 of the rotating wheel 2 is selected depending upon the desired rate of required vibrations to be activated in the liquid within the [respective] sonic range, which is determined by the empirical relationship $F=63.993\ K^{-0.5}$ kHz, based on the already achieved and expedient geometrical dimensions of the device as a whole.

The value of the parameter B is selected within the range indicated above. This range is dependent upon the physical nature of liquid that is to be subject to processing in a given instance, especially upon its viscosity and the character of the changes it undergoes under heat, based on the admissible or acceptable geometrical dimensions of the device as a whole.

The number of outlet apertures 11 for expelling the liquid from the annular chamber 4 are selected depending upon the desired ratio of the volume of output to the temperature of the heated liquid.

The width of the outlet apertures 8 of the rotating wheel 2 in the circumferential direction on its peripheral surface 5 preferably amount to one half of its circumferential pitch on the periphery of the radius R. The width of the outlet apertures 11 of the annular chamber 4 in the circumferential direction to its concentric surface 6, irrespective of their number, preferably should not exceed the width of the outlet apertures 8. The preferred uniform form of apertures 8 and 11, drawn in a direction parallel to the central axis 9, is such as illustrated in the drawing of FIG. 3.

The device for heating a liquid in accord with the invention operates in the following fashion:

In the basic and most preferred working embodiment of the device /FIG. 1,2/ the liquid to be processed is fed through an inlet aperture 3 into cavity 1 of the rotating wheel 2 in the direction as indicated by the arrow. The rotor 14 along with the rotating wheel 2 is made to revolve with the aid of an electric motor 24 via a coupling or socket 23 and a shaft 15 at a designated rate of revolution n. At the same time, the liquid that is coming into the cavity 1 of the rotating wheel 2 is expelled under pressure from the cavity 1 through a series of outlet apertures 8 in the peripheral annular wall 20 of the rotating wheel 2, entering into the annular chamber 4, that is constrained by the annular wall 20 of the rotating wheel 2 and by the concentric wall 22 of the stator 7. From the annular chamber 4 the processed liquid is discharged for consumption, further utilization or additional processing through the outlet aperture 10 in the direction shown by the arrow.

In another preferred working embodiment /FIG. 3,4/, the device operates similarly to that described above, with this exception that the liquid undergoing processing exits from the annular chamber 4 into the cavity 12 of the stator 7 through outlet apertures 11 in the concentric wall 22 of the stator 7. From cavity 12 the processed liquid is discharged from cavity 12 for consumption, utilization or additional processing through an outlet aperture 13 in the direction indicated by the arrow.

The concrete examples of practical implementations of the corresponding invention of a method of heating a liquid and a device for its implementation are presented in /Tables 1 and 2/ below.

TABLE 1

Figure 2:
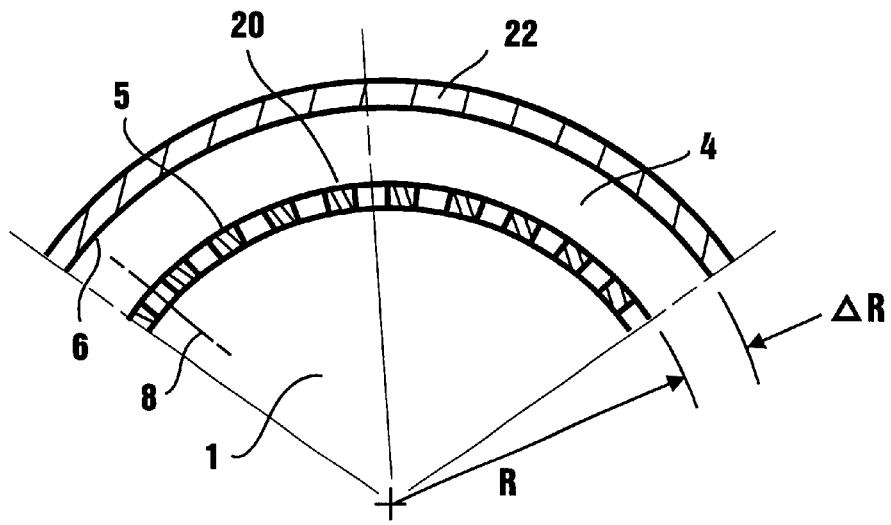
FIG. 2,4—a partial cross section of the annular chamber.

Embodiments implemented in accord with Figures 1, 2.
Liquid undergoing processing - water.

| Name | Symbol | Scale | Quantity |
|---|---|---|---|
| Number of outlet apertures on the rotating wheel | K | Pieces | 120 |
| Radius of the peripheral cylindrical surface of the rotating wheel | R | mm | 140.0 |
|  |  | inches | 5.512 |
| Radial size of the annular chamber | $\Delta R$ | mm | 9.3 |
|  |  | inches | 0.366 |
| Frequency of revolution of the rotating wheel | n | revolutions/min. | 2920 |
| Frequency of mechanical vibrations | F | kHz | 5.840 |
| Supplied energy | E | Megajoule | 46.8 |
| Output during open circulation | G | kg/min. | 64.0 |
| Increase in temperature during open circulation | $\Delta T$ | ° C. | 3.2 |
| Output when the circulation is closed by 50% | $G_I$ | kg/min. | 32.0 |
| Increase in temperature when circulation is closed by 50% | $\Delta T_I$ | ° C. | 6.4 |

TABLE 2

Figure 4:
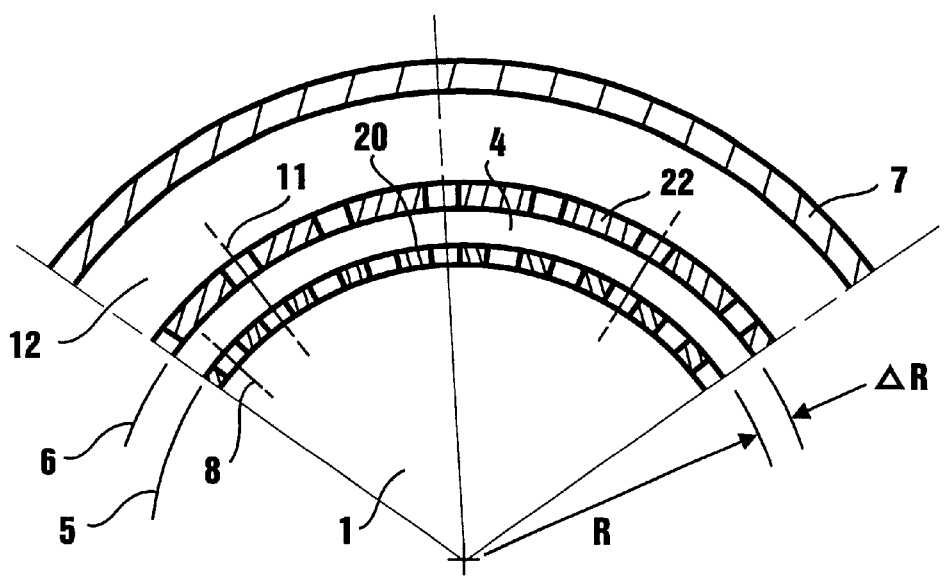

Embodiments implemented in accord with Figures 3, 4.
Liquid undergoing processing - water.

| Name | Symbol | Scale | Quantity |
|---|---|---|---|
| Number of outlet apertures on the rotating wheel | K | pieces | 192 |
| Radius of the peripheral cylindrical surface of the rotating wheel | R | mm | 223.0 |
|  |  | inches | 8.780 |
| Radial size of the annular chamber | $\Delta R$ | mm | 41.8 |
|  |  | inches | 1.646 |
| Frequency of revolution of the rotating wheel | n | revolutions/min. | 1440 |
| Frequency of mechanical vibrations | F | kHz | 4.620 |
| Number of outlet apertures in the annular chamber | $K_I$ | pieces | 128 |
| Supplied energy | E | Megajoule | 64.8 |
| Output during open circulation | G | kg/min. | 102.8 |
| Increase in temperature during open circulation | $\Delta T$ | ° C. | 3.0 |
| Output when the circulation is closed by 50% | $G_I$ | kg/min. | 51.4 |
| Increase in temperature when circulation is closed by 50% | $\Delta T_I$ | ° C. | 6.0 |

INDUSTRIAL APPLICATION

The sphere of industrial applicability of the invention is very broad and includes many branches of industry in those myriad instances where there is a need for the heating of liquid. It is impossible to illustrate these instances in an exhaustive way. Under the rubric of individual applications it is possible to note the following:

- the autonomous centralized heating of moderately-sized localized fixed non-portable facilities;
- the heating of means of transportation and mobile or field facilities;
- the efficient pre-heating of a liquid directly while it is being delivered;
- the efficient by-product of heating a liquid in various technological processes, and so on.

Bringing the rotating wheel to revolve may be accomplished either by motors /electrical, hydraulic, wind-powered, mechanical, etc./ specially designed for such purposes, or by movable and especially rotating parts of means of transportation/railroad cars and the like/.

The list of types of liquid capable of being processed likewise is very broad. The list ranges from strictly liquids like water to hydrocarbon and silicon organic liquids, and also solutions, emulsions and suspensions based on them, in a wide range of viscosity and other physical properties.

What is claimed is:

1. A method of sonic heating of a liquid using sonic vibrations of less than 20,000 Hz comprising the following steps:
   a. introducing said liquid into at least one processing region;
   b. swirling said liquid in said processing region;
   c. inducing said sonic vibrations into said liquid; and
   d. removing said liquid from said processing region.

2. A method of sonic heating of a liquid as described in claim 1 wherein said sonic vibrations are generated by mechanical effects.

3. A method of sonic heating of a liquid as described in claim 1 wherein there are a plurality of processing regions comprising at least a first cavity region and a processing chamber region.

4. A method of sonic heating of a liquid as described in claim 3, including the additional step of reintroducing said liquid into said processing chamber region for additional heating.

5. A method of sonic heating of a liquid as described in claim 1 wherein there are a plurality of processing regions including a first processing region and a second processing region.

6. A method of sonic heating of a liquid in motion comprising the following steps:
   a. maintaining said liquid in motion;
   b. generating a sonic signal at a frequency of less than 20,000 Hz;
   c. applying said sonic signal to a liquid; and
   d. inducing sonic vibrations in said liquid to heat said liquid to a desired temperature.

7. A method of sonic heating of a liquid as described in claim 6 wherein said sonic signal is in the range of about 4,000 Hz to about 6,000 Hz.

8. A method of sonic heating of a liquid as described in claim 6, including the additional step of:
   a. repeatedly applying said sonic signal to said liquid while said liquid is in motion for additional heating.

9. A method of sonic heating of a liquid in motion comprising the following steps:
   a. generating a sonic signal at a frequency of less than 20,000 Hz.;
   b. applying said sonic signal to a liquid in a selected region to induce sonic vibrations in said liquid to heat said liquid to a selected temperature; and
   c. removing said liquid from said selected region.

10. A method of sonic heating of a liquid as described in claim 9, wherein said sonic signal is in the range of about 4,000 Hz to about 6,000 Hz.

11. A method of sonic heating of a liquid as described in claim 9, including the additional step of:
    a. repeatedly applying said sonic signal to said liquid for additional heating until the selected temperature is reached.

12. A method of sonic heating of a liquid as described in claim 9 wherein said sonic signal is in the range of about 4,620 Hz to about 5,800 Hz.

* * * * *